United States Patent
Stidd

[11] Patent Number: 6,139,090
[45] Date of Patent: Oct. 31, 2000

[54] ADJUSTABLE SPOILER SUPPORT FOR RACING CAR

[76] Inventor: Robert S. Stidd, 194 Ponderosa Cir., Mooresville, N.C. 28117

[21] Appl. No.: 09/236,790

[22] Filed: Jan. 25, 1999

[51] Int. Cl.[7] .......................................................... B60J 1/00
[52] U.S. Cl. ........................................ 296/180.5; 180/903
[58] Field of Search ............................. 296/180.1, 180.2, 296/180.3, 180.5; 180/903; 248/278.1, 279.1, 288.31; 244/213, 214, 215, 216

[56] References Cited

U.S. PATENT DOCUMENTS

| | | |
|---|---|---|
| Re. 32,907 | 4/1989 | Rudolph .................................. 244/215 |
| 2,319,383 | 5/1943 | Zap ...................................... 244/213 X |
| 4,170,575 | 10/1979 | Cole ..................................... 244/215 X |
| 4,405,105 | 9/1983 | Dilmaghani et al. ..................... 244/213 |
| 4,434,959 | 3/1984 | Rudolph ................................. 244/215 |
| 4,470,569 | 9/1984 | Shaffer et al. .......................... 244/214 |
| 4,659,130 | 4/1987 | Dimora et al. ......................... 296/180.1 |
| 5,165,751 | 11/1992 | Matsumoto et al. ................... 296/180.5 |
| 5,454,619 | 10/1995 | Haraway ............................... 296/180.1 |
| 5,836,550 | 11/1998 | Paez ....................................... 244/214 |

OTHER PUBLICATIONS

Drawing—Side View of Spoiler Support Apparatus (no date).
Drawing—Perspective View of Spoiler Support Apparatus (no date).

*Primary Examiner*—D. Glenn Dayoan
*Assistant Examiner*—Patricia Engle
*Attorney, Agent, or Firm*—Admas, Schwartz & Evans, P.A.

[57] ABSTRACT

An adjustable spoiler support for adjustably supporting a aerodynamic spoiler relative to a racing car body, including an elongate support bar having opposite first and second ends and gimbals having at least two axes of movement carried by the support bar for permitting two-axis adjusting movement of the spoiler support. Attachments are provided for attaching the first end of the support bar to the spoiler and the second end of the support bar to the car body. The gimbals have at least first and second axes of movement.

11 Claims, 6 Drawing Sheets

ADJUSTABLE SPOILER SUPPORT FOR RACING CAR

TECHNICAL FIELD AND BACKGROUND OF THE INVENTION

This invention relates to an adjustable spoiler support for a racing car, for example, "stock cars" of the type which race in various series of NASCAR-sponsored races. Spoilers deflect upwardly air which is smoothly flowing across the very aerodynamic top surface of the racing car and creates a reactive downward thrust which tends to increase traction between the rear wheels of the car and the track. The angle with which the spoiler is extended into the airstream determines the downward force exerted by the deflected air on the spoiler.

A spoiler is generally formed of a thin blade of metal which is attached by an elongate bracket to, and extends transversely across, the rear of the car. The force of the air being deflected by the spoiler is sufficiently great that the spoiler itself would be deflected downwardly out of the air flow unless supported in its predetermined angled position. Thus, it is typical to cantilever the spoiler in its position by a number of spaced-apart spoiler supports which extend between the underside of the spoiler and the mounting plate by which it is attached to the car body.

A known prior art spoiler support includes a pair of brackets, one of which is welded to the underside of the spoiler and the other to the mounting plate. Welding the brackets to the spoiler can sometimes warp the spoiler. An adjustable-length support bar is attached to the brackets by Heim joints—devices which permit movement about only one axis. In some cases the spoiler supports must be placed to avoid other nearby parts of the race car, and thus may need to be placed in irregular positions. Use of prior art devices under these circumstances is difficult, since the brackets must be positioned at the precise desired angle, or the spoiler support will not fit properly.

The invention according to this application permits quick, inexpensive and easily variable attachment to and support of spoilers on racing cars.

SUMMARY OF THE INVENTION

Therefore, it is an object of the invention to provide a spoiler support which is adjustable about at least two axes.

Therefore, it is an object of the invention to provide a spoiler support which is adjustable about three axes.

It is another object of the invention to provide a spoiler support which is easily and inexpensively attached to the spoiler and the race car.

It is another object of the invention to provide a spoiler support which permits attachment to the spoiler and the race car without the need for mounting brackets.

It is another object of the invention to provide a spoiler support which can be mounted to the spoiler and the race car at varying angles.

It is another object of the invention to provide a spoiler support which is strong enough to resist speed-induced forces and yet light weight.

It is another object of the invention to provide a spoiler support which is simple in design and easily and quickly adjustable.

It is another object of the invention to provide a spoiler support which can be mounted to the spoiler and the race car without welding.

These and other objects of the present invention are achieved in the preferred embodiments disclosed below by providing an adjustable spoiler support for adjustably supporting a aerodynamic spoiler relative to a racing car body, comprising an elongate support bar having opposite first and second ends, gimbal means carried by the support bar for permitting two-axis adjusting movement of the spoiler support. Attachment means are provided for attaching the first end of the support bar to the spoiler and the second end of the support bar to the car body.

According to one preferred embodiment of the invention, the gimbal means comprise first and second gimbals having at least two axes of movement are positioned on respective ones of the first and second ends of the elongate support bar.

According to another preferred embodiment of the invention, length-adjusting means are provided for adjustably varying the length of the spoiler support.

According to yet another preferred embodiment of the invention, the length-adjusting means comprises respective first and second threaded, axially-extending bores in the first and second ends of the spoiler support bar. First and second mating threaded rods are positioned in the bores and carrying a respective one of the gimbals on one end thereof.

According to yet another preferred embodiment of the invention, the gimbals each include gimbal housings, and wherein a first axis of movement of the first and second gimbals is defined by the axis of rotation of the first and second mating threaded rods relative to the gimbal housings.

Preferably, a second axis of movement of the first and second gimbals is defined by pivotal movement between a respective one of the threaded rods and respective first and second movable pivot members carried in the gimbals.

According to yet another preferred embodiment of the invention, each gimbal housing includes an elongate slot through which the threaded rod communicates with the pivot member, the length of the elongate slot limiting the pivot range of the gimbal housing relative to the threaded rod.

According to yet another preferred embodiment of the invention, the attachment means comprises a machine screw positioned in a matingly-threaded screw hole in the gimbal housing.

According to yet another preferred embodiment of the invention, an adjustable spoiler support is provided for adjustably supporting a aerodynamic spoiler relative to a racing car body, comprising an elongate support bar having opposite first and second ends, a first gimbal unit carried on one end of the support bar for attaching the support bar to the spoiler, and a first gimbal unit carried on one end of the support bar for attaching the support bar to the spoiler. Attachment means are provided for attaching opposite ends of the spoiler support to the spoiler and the car body.

According to yet another preferred embodiment of the invention, a spoiler assembly for a racing car is provided, comprising an elongate spoiler blade transversely positioned at a predetermined angle across a rear deck portion of the racing car and a plurality of adjustable spoiler supports attaching the spoiler in the predetermined angle to the rear deck portion of the racing car. Each of the spoiler supports comprises an elongate support bar having opposite first and second ends, gimbal means carried by the support bar for permitting at least two-axis adjusting movement of the spoiler support, and attachment means for attaching the first end of the support bar to the spoiler and the second end of the support bar to the car body.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
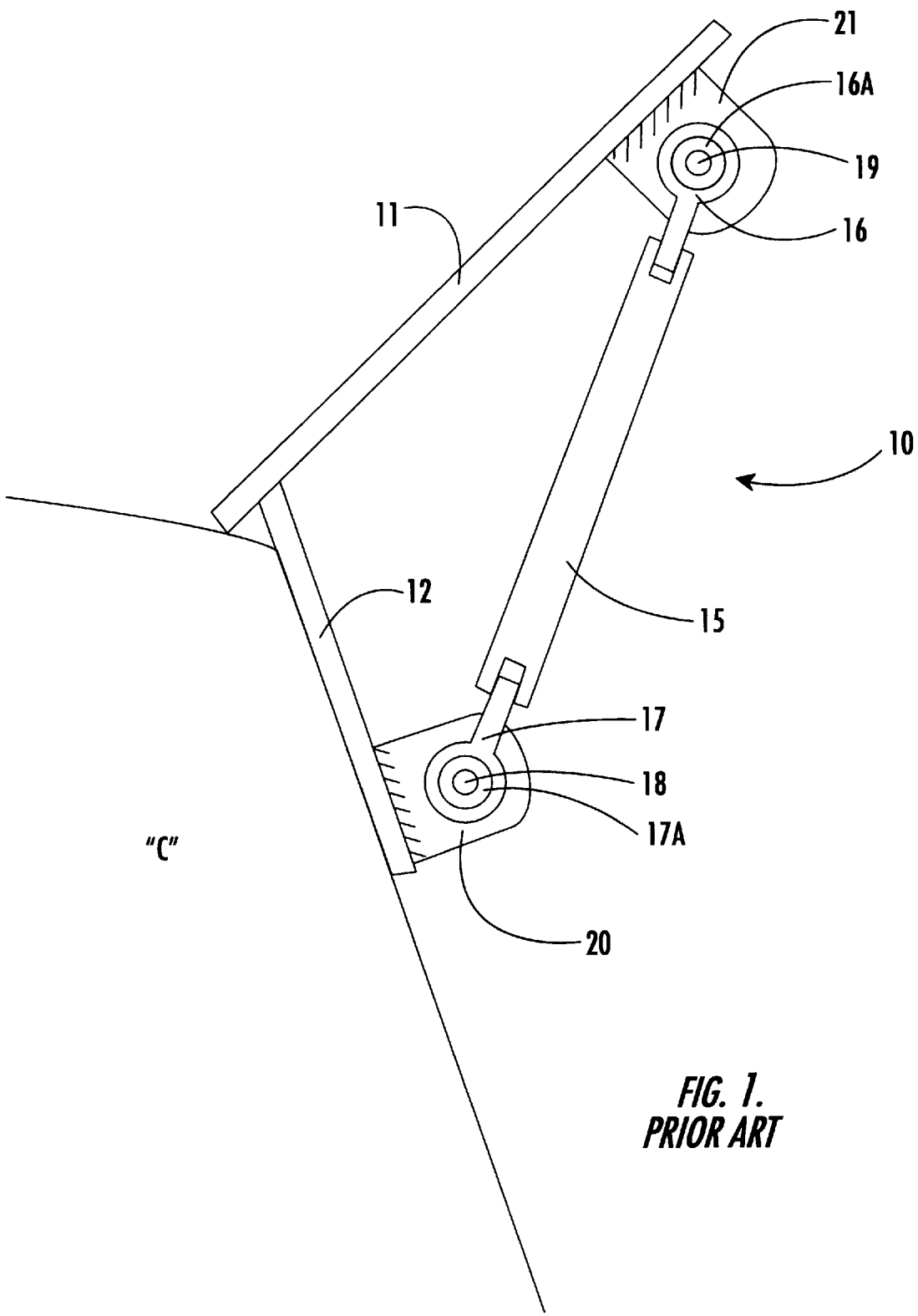
FIG. 1 is a side elevation view of a prior art spoiler support and mounting brackets.

Referring now specifically to the drawings, a spoiler support according to the prior art is illustrated in FIG. 1 and shown generally at reference numeral 10. The spoiler support 10 is mounted between a spoiler 11 and a mounting plate 12 secured to the race car "C." The spoiler support 10 is formed from an elongate rod 15 threaded on opposite ends to receive Heim joints 16 and 17. The Heim joints include annular inserts 16A and 17A through which are extended pins 18 and 19. The pins 18 and 19 are captured by brackets 20 and 21 which are welded to the mounting plate is and spoiler 11, respectively. As is apparent from FIG. 1, the spoiler support 10 must be mounted in alignment with the mounting axis of the brackets 20 and 21. If and when a change in mounting alignment is required, the brackets must be removed, repositioned, and rewelded.

Figure 2:
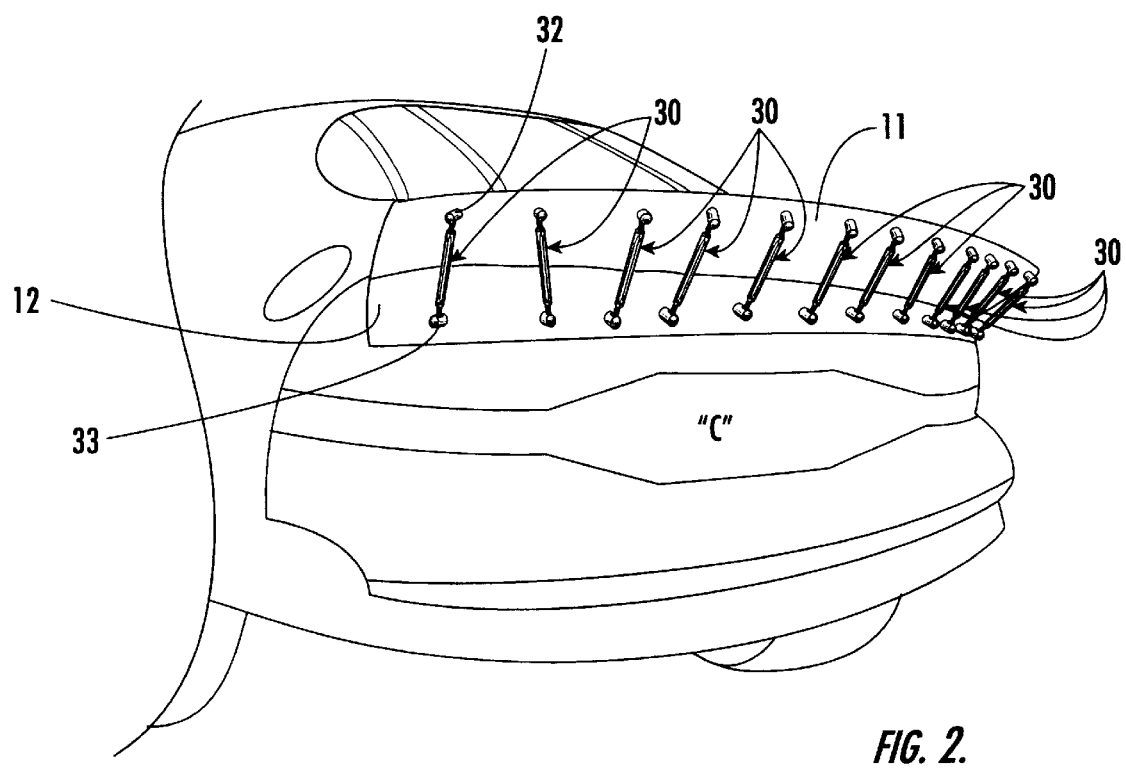
FIG. 2 is a perspective view of a racing car with a spoiler mounted on the rear deck of the car with spoiler supports according to an embodiment of the invention.

Referring now to FIG. 2, racing car "C" is shown with the spoiler 11 being supported by twelve spoiler supports 30 according to the present invention. In accordance with the invention, the spoiler supports 30 can be positioned at any angle or orientation, as shown in FIG. 2.

Figure 3:
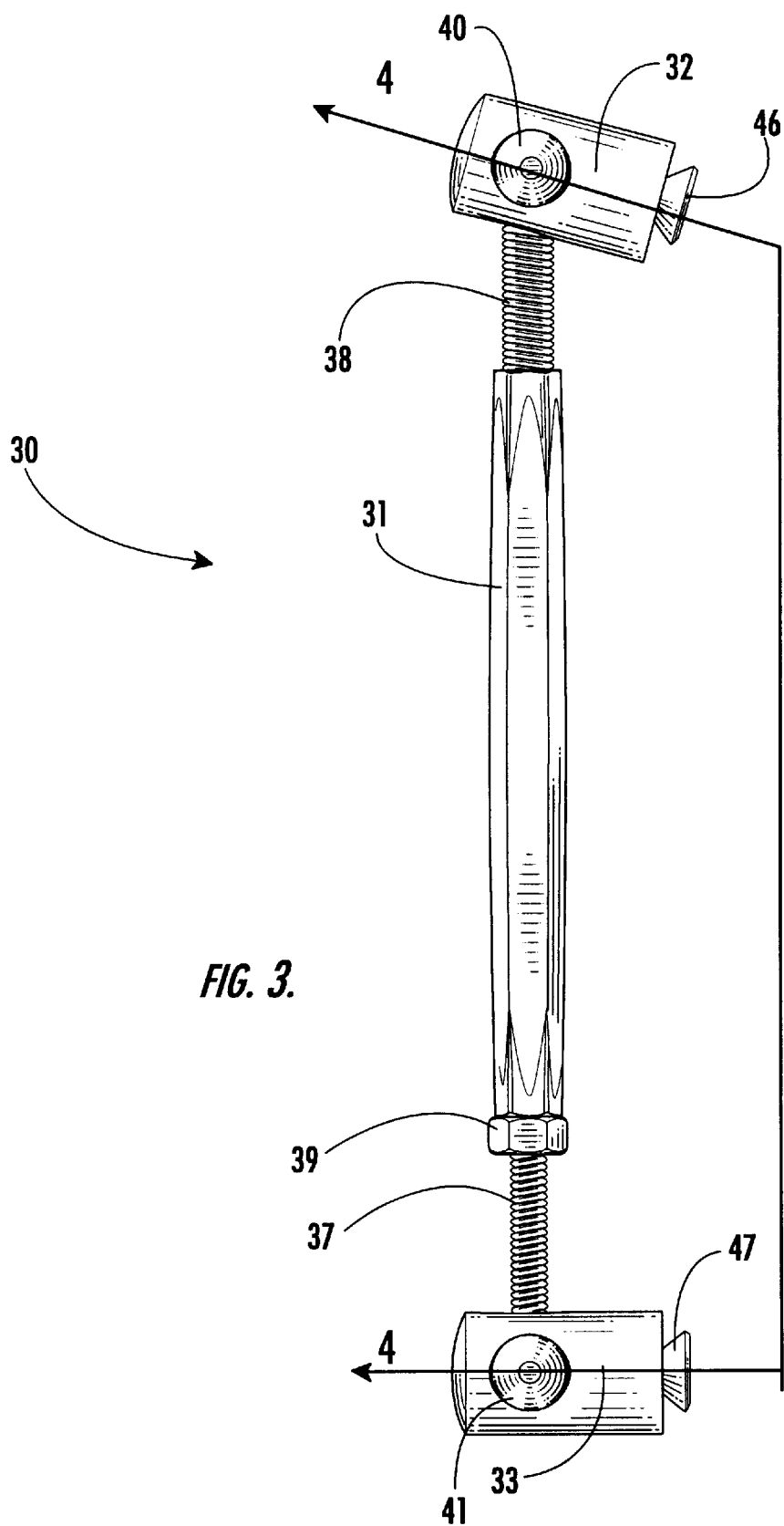
FIG. 3 is a more detailed elevational view of a spoiler support shown in FIG. 2.
Figure 4:
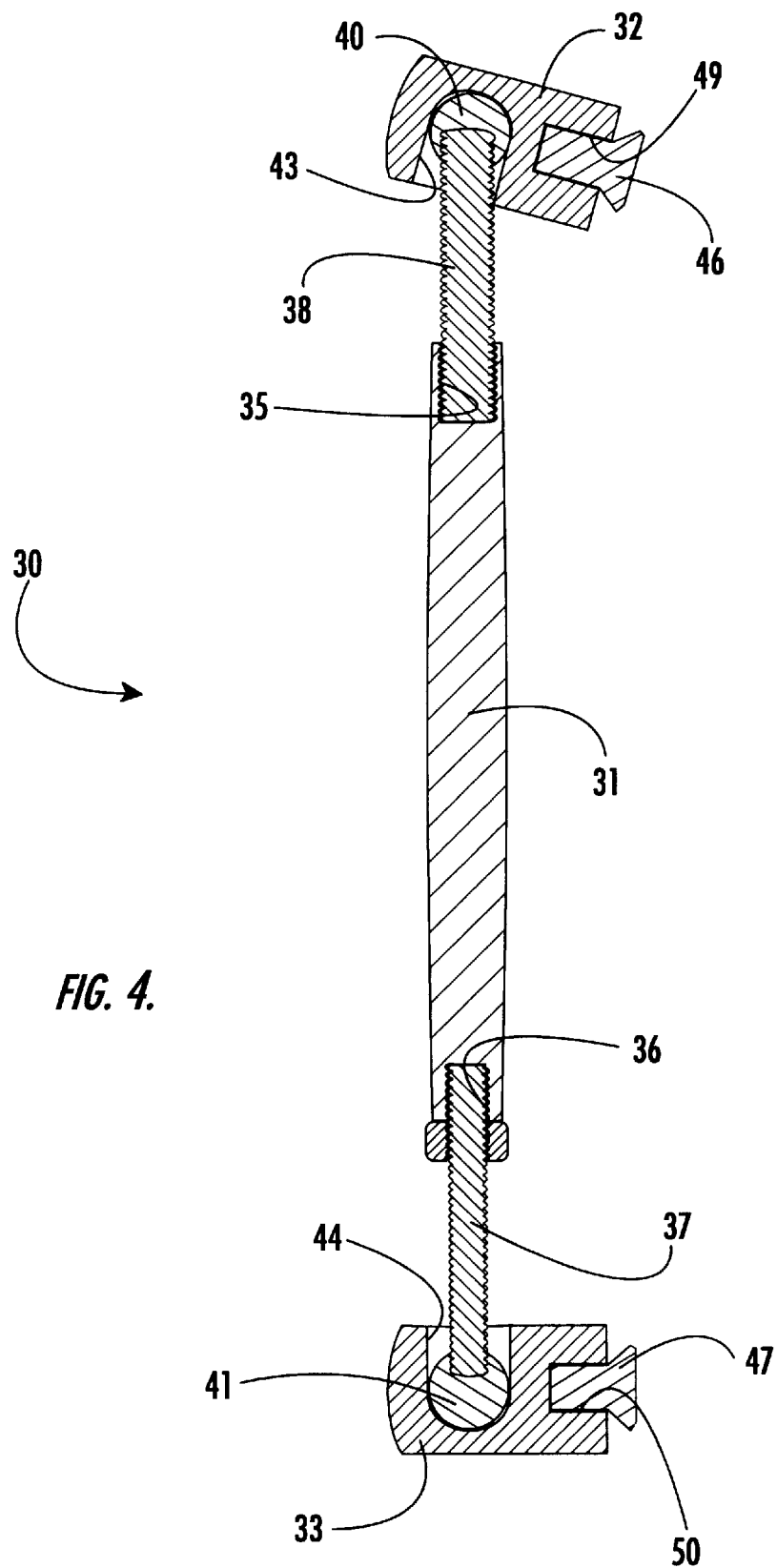
FIG. 4 is a cross-sectional view of a spoiler support taken along lines 4—4 of FIG. 3.
Figure 5:
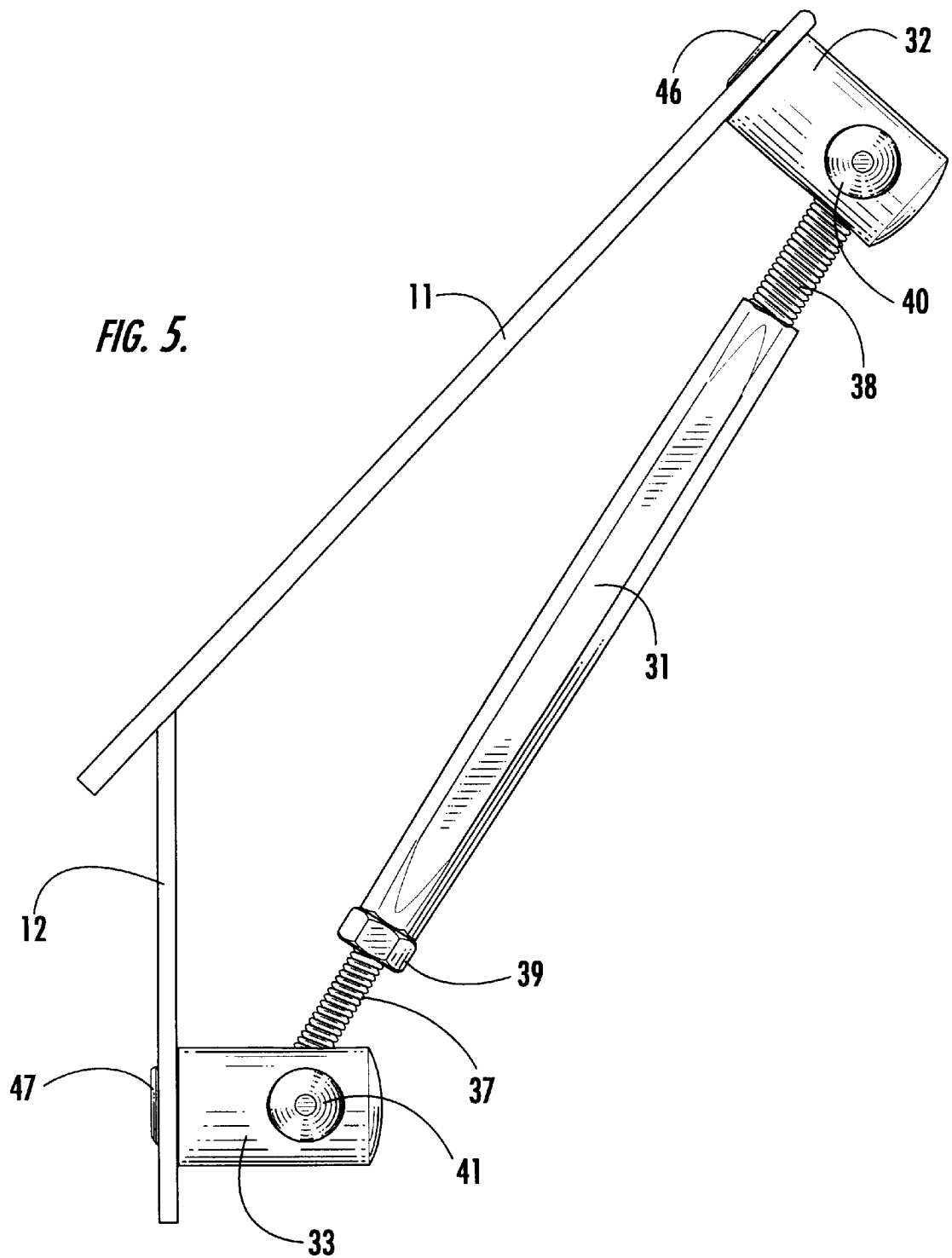
FIG. 5 is a is a side elevation view of the spoiler support shown in FIGS. 2, 3 and 4 supporting a spoiler.

Referring now to FIGS. 3 and 4, the spoiler support 30 is formed of a hex-shaped aluminum support bar 31. First and second gimbals 32 and 33 are positioned on opposite ends of the support bar 31. As is best shown in FIG. 4, the support bar 31 includes threaded bores 35, 36 which receive threaded rods 37, 38. A hex lock nut 39 locks the support bar 31 in a desired position. While aluminum is a preferred material, other materials, such as other lightweight materials, such as alloys and non-metal composites are also suitable.

Threaded rods 37, 38 are threaded into respective cylindrical pivot members 40, 41 mounted for pivotal movement in the housings of the gimbals 32, 33. Threaded rods 37, 38 are locked into the cylindrical pivot members 40, 41 with a locking compound such as sold under the trademark Loc-Tite. Elongate slots 43, 44 provide clearance for the gimbals 32, 33 to pivot as needed for adjustment.

Attachment means comprising machine screws 46, 47 positioned in matingly-threaded screw holes 49, 50 fix the spoiler support 30 to the spoiler 11 and the mounting bracket 12.

Figure 6:
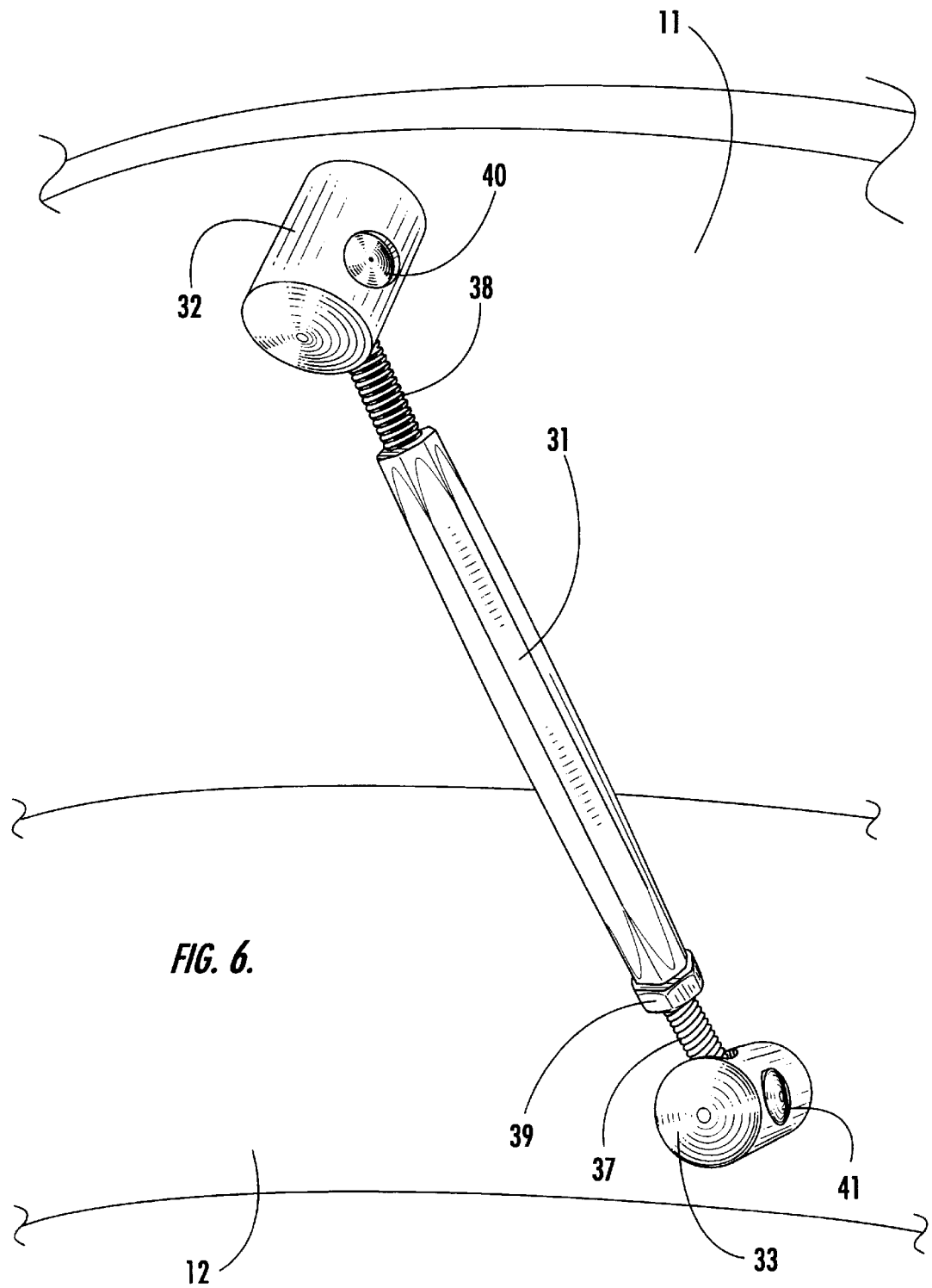
FIG. 6 is a front-facing elevation view normal to the view of FIG. 5.

The spoiler support 30 can thereby be adjusted to a very wide range of positions relative to the spoiler 11. The threaded rods 37, 38 define a first axis of movement which permits the angle of the spoiler 11 to be changed by changing the overall length of the spoiler support 30 while also permitting the gimbals to be angled as desired. The pivot axis of the pivot members 40, 41 defines a second axis of movement and permits the gimbals 32, 33 to fit flush against the surface of the spoiler 11 and the mounting bracket 12. Finally, the axis of rotation of the machine screws 46, 47 in the screw holes 49, 50 defines a third axis of rotation and permits one end of the spoiler support 30 to be laterally offset relative to the other end. See FIG. 6.

The dimensions of a spoiler support according to one preferred embodiment of the invention is set out below for purpose of illustration:

| | |
|---|---|
| Length of support bar | 4 inches |
| Effective length of each threaded rod | 1.25 inches |
| Threads per inch on threaded rod | 20 per inch |
| Diameter of gimbal housings | .75 inches |
| Range of pivot of gimbal housing | plus/minus approx. 35 degrees |
| Threads per inch on machine screws | 16 per inch |

To install a spoiler support 30, holes in the spoiler 11 and mounting plate 12 are positioned, drilled and countersunk. The support 30 is installed by attaching gimbal 32 to the spoiler 11 and gimbal 33 to the mounting plate 12 with the machine screws 46 and 47. The three-dimensional swivel action, as described above, permits adjustment based entirely on the requirements of the spoiler and not the design limitations of the spoiler support 30.

To adjust the spoiler support 30, the lock nut 39 is loosened with a hex wrench and the support bar 31 is turned with a hex wrench. To remove the spoiler supports 30, the machine screws 46 and 47 are removed and the support removed. No brackets are left to be removed.

A spoiler support is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An adjustable spoiler support for adjustably supporting an aerodynamic spoiler in a fixed, stationary adjustment position relative to a racing car body for preventing movement of the spoiler resulting from the force of air flowing over the spoiler when the racing car is in motion, comprising:

(a) an elongate support bar having opposite first and second ends, said first and second ends comprising a length-adjusting means including respective first and second axially-extending bores in the first and second ends and respective first and second mating threaded rods positioned in said first and second bores;

(b) first and second gimbals positioned on respective ends of said support bar for permitting adjusting movement of said spoiler support during adjustment of the spoiler to its fixed, stationary adjustment position, whereby the support bar is permitted to incline freely in any direction;

(c) attachment means for attaching the first end of the support bar to the spoiler and the second end of the support bar to the car body; and (d) locking means cooperating with at least one of said threaded rods for locking the spoiler support in its fixed stationary adjustment position.

2. An adjustable spoiler support according to claim 1, wherein said gimbals each include gimbal housings, and wherein a first axis of movement of the first and second gimbals is defined by the axis of rotation of the first and second mating threaded rods relative to said gimbal housings.

3. An adjustable spoiler support according to claim 1, wherein a second axis of movement of the first and second gimbals is defined by pivotal movement between a respective one of the threaded rods and respective first and second movable pivot members carried in said gimbals.

4. An adjustable spoiler support according to claim 3, wherein each gimbal housing includes an elongate slot through which the threaded rod communicates with said pivot member, the length of the elongate slot limiting the pivot range of the gimbal housing relative to said threaded rod and maintaining the respective gimbal housings in place on the spoiler and on the mounting plate.

5. An adjustable spoiler support according to claim 3, wherein said attachment means comprises a machine screw positioned in a matingly-threaded screw hole in said gimbal housing.

6. A spoiler assembly for a racing car, comprising:
  (a) an elongate aerodynamic spoiler blade adapted to be transversely positioned at a predetermined fixed angle across a rear deck portion of the racing car for deflecting air flowing along the top of the racing car upwardly to create a reactive downward thrust for increasing traction between rear wheels of the racing car and a surface upon which the racing car is moving; and
  (b) a plurality of adjustable spoiler supports for attaching the spoiler in said predetermined fixed angle to the rear deck portion of the racing car for supporting the spoiler in a fixed stationary adjustment position relative to the racing car for preventing movement of the spoiler resulting from the force of air flowing over the spoiler when the racing car is in motion, each of said spoiler supports comprising:
    (i) an elongate support bar having opposite first and second ends, said first and second ends comprising a length-adjusting means including respective first and second axially-extending bores in the first and second ends, and first and second mating threaded rods positioned in said first and second bores, respectively;
    (ii) first and second gimbals positioned on respective ends of said support bar for permitting adjusting movement of said spoiler support during adjustment of the spoiler to its fixed stationary adjustment position, whereby the support bar is permitted to incline freely in any direction;
    (iii) attachment means for attaching the first end of the support bar to the spoiler and the second end of the support bar to the car body; and
    (iv) locking means cooperating with at least one of said threaded rods for locking the spoiler support in its fixed stationary position.

7. A spoiler assembly according to claim 6, and including length-adjusting means for adjustably varying the length of the spoiler support.

8. A spoiler assembly according to claim 6, wherein said gimbals each include gimbal housings, and wherein a first axis of movement of the first and second gimbals is defined by the axis of rotation of the first and second mating threaded rods relative to said gimbal housings.

9. A spoiler assembly according to claim 8, wherein said attachment means comprises a machine screw positioned in a matingly-threaded screw hole in said gimbal housing.

10. A spoiler assembly according to claim 6, wherein a second axis of movement of the first and second gimbals is defined by pivotal movement between a respective one of the threaded rods and respective first and second movable pivot members carried in said gimbals.

11. A spoiler assembly according to claim 6, wherein each gimbal housing includes an elongate slot through which the threaded rod communicates with said pivot member, the length of the elongate slot limiting the pivot range of the gimbal housing relative to said threaded rod.

\* \* \* \* \*